3,401,202
NOVEL PROPIONANILIDES

William Blythe Wright, Jr., Woodcliff Lake, Herbert Joseph Brabander, Pearl River, and Robert Allis Hardy, Jr., Ridgewood, N.J., assignors to American Cyanamid Company, Stamford, Conn., a corporation of Maine
No Drawing. Filed Apr. 12, 1966, Ser. No. 541,981
8 Claims. (Cl. 260—562)

ABSTRACT OF THE DISCLOSURE

Substituted phenylalkylene aminoisopropylpropionanilides prepared by the acylation of the corresponding substituted phenylalkyleneaminoisopropylanilide with propionic anhydride and by other methods, are described. These compounds are useful as analgesics and analgesic antagonists.

---

This invention relates to new organic compounds. More particularly, it relates to propionanilide derivatives, which are active as non-narcotic analgesics and analgesic antagonists, of the formula:

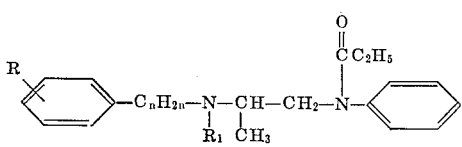

wherein R is selected from the group consisting of hydrogen, lower alkyl, lower alkoxy and halogen; $R_1$ is selected from the group consisting of allyl, butenyl, dimethallyl, 2-methylpropenyl, cyclopropylmethyl and cyclobutylmethyl; $n$ is an integer from 1 to 2, and acid addition salts thereof.

These compounds in the form of their bases may be solids or liquids at room temperature and as such are relatively insoluble in water, but soluble in most organic solvents. They form salts with mineral acids which are soluble in water and the common alcohols, but relatively insoluble in ether.

The compounds of this invention can be prepared by several methods. The most convenient is by acylation of an appropriate ethylenediamine derivative which can be illustrated as follows:

(I)

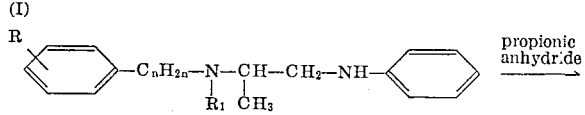

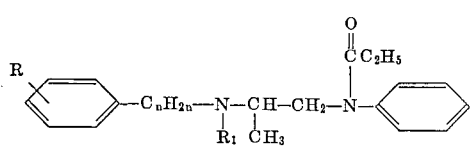

where R, $R_1$, and $n$ are as defined above.

This reaction is carried out by heating the reagents alone or in the presence of an inert solvent. The reaction can be carried out, for example, by heating on the steam bath for one to six hours, and the product can be purified by distillation or by recrystallization of a suitable salt.

A second method of preparation is by the alkylation of an N-(aminoalkyl)propionanilide.

(IIa)

(IIb)

wherein R, $R_1$, and $n$ are as defined above and X is a reactive halogen or arylsulfonyloxy group. This can be carried out by reaction with a reagent such as benzyl chloride, p-methyl benzyl chloride, m-methyl benzyl bromide, p-chlorobenzyl chloride, phenethyl bromide and the like. Suitable solvents for this reaction are benzene, ethanol, butanol and the like. An acid acceptor such as sodium carbonate facilitates reaction. A temperature in the range of 50°–150° C. is most desirable for carrying out the reaction.

In a further method N-(aminoalkyl)propionanilide can also be reductively alkylated with an appropriate aldehyde such as benzaldehyde, p-methylbenzaldehyde, phenylacetaldehyde, p-methoxybenzaldehyde and the like.

(III)

wherein R and $R_1$ are as defined above and $n$ is 0 or 1. Such alkylation is conveniently carried out in a solvent such as ethanol and in the presence of a catalyst such as palladium-on-carbon. A temperature in the range of 20°–50° C. is usually satisfactory.

Other alkylation methods are also suitable, such as the two examples outlined below:

(IV)

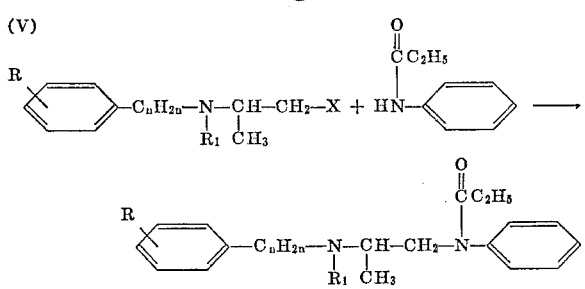

In these reactions R, $R_1$ and $n$ are as defined above and X is reactive halogen or arylsulfonyloxy. In the latter example, the reaction goes best when an alkaline condensing agent such as sodium, sodium hydride or sodamide is employed.

The compounds of the present invention are physiologically active in warm-blooded animals as non-narcotic analgesics and analgesic antagonists. The dosage of the active components of this invention will depend on the route of administration, age, weight, and condition of the warm-blooded animal. A total daily dose of from about 10 mg. to about 1000 mg. given singly or in divided dosage several times daily embraces the effective range of treatment of most conditions for which the compounds are useful.

The active compounds of the present invention can be used in the form of compositions preferably administered in dosage form such as tablets, pills, capsules, powders, granules, sterile parenteral solutions or suspensions, oral solutions or suspensions and the like. For preparing solid compositions such as tablets, the principal active ingredient is mixed with conventional tableting ingredients such as corn starch, lactose, sucrose, sorbitol, talc. stearic acid, magnesium stearate, dicalcium phosphate, gums, and similar materials as pharmaceutical diluents or carriers. The tablets or pills of the novel compounds can be laminated or otherwise compounded to provide a dosage form affording the advantage of prolonged or delayed action or predetermined succesive action of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate and the like. A particularly advantageous enteric coating comprises a styrene maleic acid copolymer together with known materials contributing to the enteric properties of the coating.

The liquid forms in which the novel composition of the present invention may be incorporated for administration include suitably flavored emulsions with edible oils, such as, cottonseed oil, sesame oil, coconut oil, peanut oil and the like, as well as elixirs and similar pharmaceutical vehicles. Sterile suspensions or solutions are required for parenteral use. Isotonic preparations containing suitable preservatives are also highly desirable for injection use.

The term unit dosage form as used in the specification and claims refers to physically discrete units suitable as unitary dosage for warm-blooded animal subjects, each unit containing a predetermined quantity of active material calculated to produce the desired therapeutic effect in association with the required pharmaceutical diluent, carrier or vehicle.

The new compounds of this invention are active as *non-narcotic analgesics and analgesic antagonists*. The non-narcotic analgesic actions of the compounds of this invention may be demonstrated in several ways. These compounds show a markedly different type of analgesic actions than the analgesic derivatives described in our U.S. Patent 2,944,081. The analgesic compounds of U.S. Patent 2,944,081 clearly show morphine-like actions in man, with sufficient addiction liability to warrant control as opiates [Federal Register, vol. 25, p. 10,387 (Oct. 29, 1960)]. Furthermore, the analgesic compounds of U.S. Patent 2,944,081 generally show good activity in the rat tail-flick testing procedure described by F. E. D'Amour and D. L. Smith, J. Pharmacol. Exptl. Therap., vol. 72, p. 74 (1941). Experience has shown there is a high predictive correlation between activity in this test and addition liability in man [L. S. Harris and A. K. Pierson, J. Pharmacol. Exptl. Therap., vol. 143, p. 141 (1964)]. The new compounds of this invention, however, are inactive when tested by this procedure for determining narcotic-type actions. On the other hand, they are active when tested by the procedure of E. Siegmund et al., Proc. Soc. Exptl. Biol. Med., vol. 95, p. 729 (1957), "A Method for Evaluating Both Non-Narcotic and Narcotic Analgesics." The novel compounds of this invention are, therefore, non-narcotic analgesics, as judged by these tests, and may be considered as useful analgesics which have no addiction hazard. Analgesics which produce satisfactory pain-relief without serious side effects particularly including the tolerance, habituation and drug dependence of the opiates have been sought for many years. The novel compounds of this invention are non-narcotic-analgesics, as described above, and do not show the well known morphine-like properties characteristic of the opiates when tested in warm blooded animals.

The procedure of E. Siegmund et al. (cited above) is used to demonstrate the non-narcotic actions of the compounds of this invention. This method measures the inhibition of a "writhing syndrome" induced in mice by phenyl-p-quinone. By this procedure, intraperitoneal injection of a standard dose of phenyl-p-quinone produces a syndrome characterized by a series of "writhing episodes" evident as intermittent contractions of the abdomen, twisting and turning of the trunk and extension of the hind legs, beginning 3 to 5 minutes after the injection. All control mice exhibit the syndrome continuously for more than 30 minutes. Test agents are administered orally (in starch) to group of mice (2 to 10 animals per dose level) prior to the injection of phenyl-p-quinone, and the number of writhing episodes are counted during a several minute observation period (usually 3 minutes) while the writhing syndrome is effective (usually 15 minutes after injection of phenyl-p-quinone). An active non-narcotic analgesic will markedly reduce the number of writhing episodes counted during the observation period as compared to controls. This procedure is statistically standardized and may be used for screening purposes to distinguish active from inactive agents, and, by repeating these procedures at graded dose levels in additional groups of mice, can be used to determine the effective dose level for a given precentage of animals (e.g., the $ED_{50}$). When tested by these procedures, the new compounds of this invention are active as non-narcotic analgesics at non-toxic dose levels.

In addition, some of the compounds of this invention show analgesic antagonist actions when tested against a selected dose of morphine. Experience has shown that narcotic antagonists are capable of relieving pain in man (despite the fact they are generally inactive in the rat tail-flick procedure; see above), and have little or no addiction hazard (Harris and Pierson, cited above). Furthermore, introduction of N-alkenyl and N-cycloalkyl-methyl moieties ($R_1$) for example, in the compounds of this invention does not, in general in the prior art, always produce analgesic atagonism. In particular, analgesic antagonist activity has not been heretofore observed in acyclic molecules with a high degree of stereochemical flexibility. Previously known analgesic antagonists generally have N-alkenyl and N-cycloalkyl-methyl moieties attached to rigid polycyclic structures such as morphine and related opium derivatives, the morphinans and the benzomorphans. Therefore, our findings that the flexible, acyclic molecules of the compounds of this invention show particularly desirable activity as non-narcotic analgesics and analgesic antagonists as unobvious, and therefore, not predictable.

The following examples describe in detail the preparation of representative propionanilides of the present invention. Parts are by weight unless otherwise indicated.

Example 1.—Preparation of N-[2-(N-benzyl-N-cyclopropylmethylamino)propyl]propionanilide A mixture of 27 parts of N - benzyl - N - cyclopropylmethylamine, 19.3 parts of α - bromopropionanilide and 150 parts of benezene is heated at reflux temperature for 7 hours, cooled and filtered. The filtrate is washed with dilute sodium hydroxide solution and then with water, dried over magnesium sulfate and concentrated to remove the solvent. The residue, 24.9 parts, is nearly pure 2 - (N - benzyl - N - cyclopropylmethylamino) propionanilide.

A solution of 23.5 parts of the above compound in 150 parts of tetrahydrofuran is added with stirring and cooling to a mixture of 5.8 parts of lithium aluminum hydride in 250 parts of tetrahydrofuran. The reaction mixture is heated at reflux temperature for 5 hours and is then treated with 40 parts of 6.5 sodium hydroxide solution. The precipitate is filtered off and the mother liquor is distilled. $N^2$ - benzyl - $N^2$ - cyclopropylmethyl - $N^1$-phenyl - 1,2 - propanediamine is collected at 165–170° C./0.5 mm.

A mixture of 13.3 parts of the above compound and 25 parts of propionic anhydride is heated at reflux temperature for 3 hours and distilled. The N - [2 - (N-benzyl-N - cyclopropylmethylamino)propyl]propionanilide is collected at 180–185° C./0.5 mm. This compound forms a hydrochloride which melts at 159–161° C.

Example 2.—Preparation of N-[2-(N-benzyl-N-cyclobutylmethylamino)propyl]propionanilide hydrochloride The above compound, melting point 158–160° C. is obtained when N - benzyl - N - cyclobutylmethylamine is substituted for N - benzyl - N - cyclopropylmethylamine in the procedure of Example 1.

Example 3.—Preparation of N - [2 - (N - cyclopropylmethyl - N - p - methylbenzylamino)propyl] propionanilide hydrochloride.

A mixture of 10 parts of N - [2 - (N - benzyl - N-cyclopropylmethylamino)propyl]propionanilide hydrochloride (Example 1), 125 parts of 90% ethanol and 1 part of 10% palladium-on-carbon catalyst is shaken in the Parr hydrogenator under about 3 atmospheres of hydrogen pressure until reduction is complete. The catalyst is filtered off and the mother liquor is concentrated to remove the solvent. The crystalline residue, N - [2-(cyclopropylmethylamino)propyl]propionanilide hydrochloride is recrystallized from ethanol, melting point 176–177° C. This product is converted to the base by mixing with a slight excess of dilute sodium hydroxide, extracting the base into ether and concentrating.

A mixture of 4.1 parts of N - [2 - (cyclopropylmethylamino)propyl]propionanilide, 3 parts of p-methylbenzyl bromide, 1.7 parts of sodium carbonate and 40 parts of ethanol is heated at reflux temperature for 20 hours and then concentrated to remove the solvent. The residue is shaken with a mixture of 25 parts of water and 200 parts of ether and the layers are separated. The ether layer is dried over magnesium sulfate and distilled. The N-[2-(N - cyclopropylmethyl - N - p - methylbenzylamino)propyl]propionanilide is collected at 166–172° C./0.1 mm. When this oil is dissolved in ether and treated with ethanolic hydrogen chloride, the hydrochloride salt, melting point 186–188° C. is obtained.

Example 4.—Preparation of N-[2-(N-cyclopropylmethyl-N-m-methylbenzylamino)propyl]propionanilide The above compound, boiling point 165–170° C./0.05 mm. is obtained when m-methylbenzyl bromide is substituted for p-methylbenzyl bromide in the procedure of Example 3.

Example 5.—Preparation of N-[2-(N-m-chlorobenzyl-N-cyclopropylmethylamino)propyl]propionanilide When m-chlorobenzyl chloride is substituted for p-methylbenzyl bromide in the procedure of Example 3, the above compound, boiling point 160–165° C./0.1 mm., is obtained.

Example 6.—Preparation of N-[2-(N-p-chlorobenzyl-N-cyclopropylmethylamino)propyl]propionanilide If the p-methylbenzyl bromide is replaced by p-chlorobenzyl chloride in the procedure of Example 3, the above compound, melting point 159–161° C. is obtained.

Example 7.—Preparation of N-[2-(N-cyclopropylmethyl-N-p-fluorobenzylamino)propyl]propionanilide The above compound, boiling point 168–172° C./0.08 mm., is obtained when p-fluorobenzyl chloride is used in place of p-methylbenzyl bromide in the procedure of Example 3.

Example 8.—Preparation of N-[2-(N-cyclopropylmethyl-N-phenethylamino)propyl]propionanilide If phenethyl bromide is used in place of p-methylbenzyl bromide in the procedure of Example 3, the above compound, boiling point 175–180° C./0.07 mm. is obtained.

Example 9.—Preparation of N-[2-(N-cyclobutylmethyl-N - p - methylbenzylamino)propyl]propionanilide hydrochloride The above compound, melting point 173–174° C. is obtained when N - [2 - (N - benzyl-N-cyclobutylmethylamino)propyl]propionanilide hydrochloride (Example 2), is substituted for N-[2-(N-benzyl-N-cyclopropylmethylamino)propyl]propionanilide hydrochloride in the procedure of Example 3.

Example 10.—Preparation of N-[2-(N-m-chlorobenzyl-N-cyclobutylmethylamino)propyl]propionanilide If m-chlorobenzyl chloride is reacted with N-[2-(cyclobutylmethylamino)propyl]propionanilide by the procedure of Example 3, the above compound, boiling point 175–180° C./0.2 mm. is obtained.

Example 11.—Preparation of N-[2-(N-p-bromobenzyl-N-cyclopropylmethylamino)propyl]propionanilide When p-bromobenzyl chloride is substituted for p-methylbenzyl bromide in the procedure of Example 3, the above compound is obtained.

Example 12.—Preparation of N-[2-(N-cyclopropylmethyl-N-p-methoxybenzylamino)propyl]propionanilide The above compound is obtained when p-methoxybenzyl bromide is substituted for p-methylbenzyl bromide in the procedure of Example 3.

Example 13.—Preparation of N-[2-(N-allyl-N-p-methylbenzylamino)propyl]propionanilide A mixture of 3.1 parts of $N^2$-allyl-$N^2$-p-methylbenzyl-$N^1$-phenyl-1,2-propanediamine and 15 parts of propionic anhydride is heated at reflux temperature for 4 hours and then distilled. The N-[2-(N-allyl-N-p-methylbenzylamino) propyl]propionanilide is collected at 155–165° C. at 1.0 mm.

Example 14.—Preparation of N-[2-(N-butenyl-N-p-methylbenzylamino)propyl]propionanilide A mixture of 3.3 parts of $N^2$-butenyl-$N^2$-p-methylbenzyl-$N^1$-phenyl-1,2-propanediamine and 20 parts of propionic anhydride is heated at reflux temperature for 3 hours and distilled. The N-[2-(N-butenyl-N-p-methylbenzylamino)propyl]propionanilide is collected at 165–175° C. at 0.2 mm.

Example 15.—Preparation of N-[2-(N-methallyl-N-p-methylbenzylamino)propyl]propionanilide The above compound is obtained when $N^2$-methylallyl-$N^2$-p-methylbenzyl-$N^1$-phenyl - 1,2 - propanediamine is reacted with propionic anhydride by the procedure of Example 13.

Example 16.—Preparation of N-[2-(N-2-methylpropenyl-N-p-methylbenzylamino)propyl]propionanilide The above compound is obtained when $N^2$-2-methylpropenyl-$N^2$-p-methylbenzyl-$N^1$-phenyl - 1,2 - propanediamine is reacted with propionic anhydride by the procedure of Example 13.

What is claimed is:
1. N - [2 - (N - cyclopropylmethyl - N - p - methylbenzylamino)propyl]propionanilide.
2. N - [2 - (N - benzyl - N - cyclopropylmethylamino)propyl]propionanilide.
3. N - [2 - (N - benzyl - N - cyclobutylmethylamino)propyl]propionanilide.
4. N - [2 - (N - cyclopropylmethyl - N - m - methylbenzylamino)propyl]propionanilide.
5. N - [2 - (N - p - chlorobenzyl - N - cyclopropylmethylamino)propyl]propionanilide.
6. N - [2 - (N - cyclopropylmethyl - N - p - fluorobenzylamino)propyl]propionanilide.
7. N - [2 - (N - cyclopropylmethyl - N - phenethylamino)propyl]propionanilide.
8. N - [2 - (N - butenyl - N - p - methylbenzylamino)propyl]propionanilide.

References Cited

UNITED STATES PATENTS

| | | | |
|---|---|---|---|
| 3,016,382 | 1/1962 | Wright et al. | 260—294 |
| 2,944,081 | 7/1960 | Wright et al. | 260—562 |

HENRY R. JILES, *Primary Examiner.*

H. I. MOATZ, *Assistant Examiner.*